UNITED STATES PATENT OFFICE.

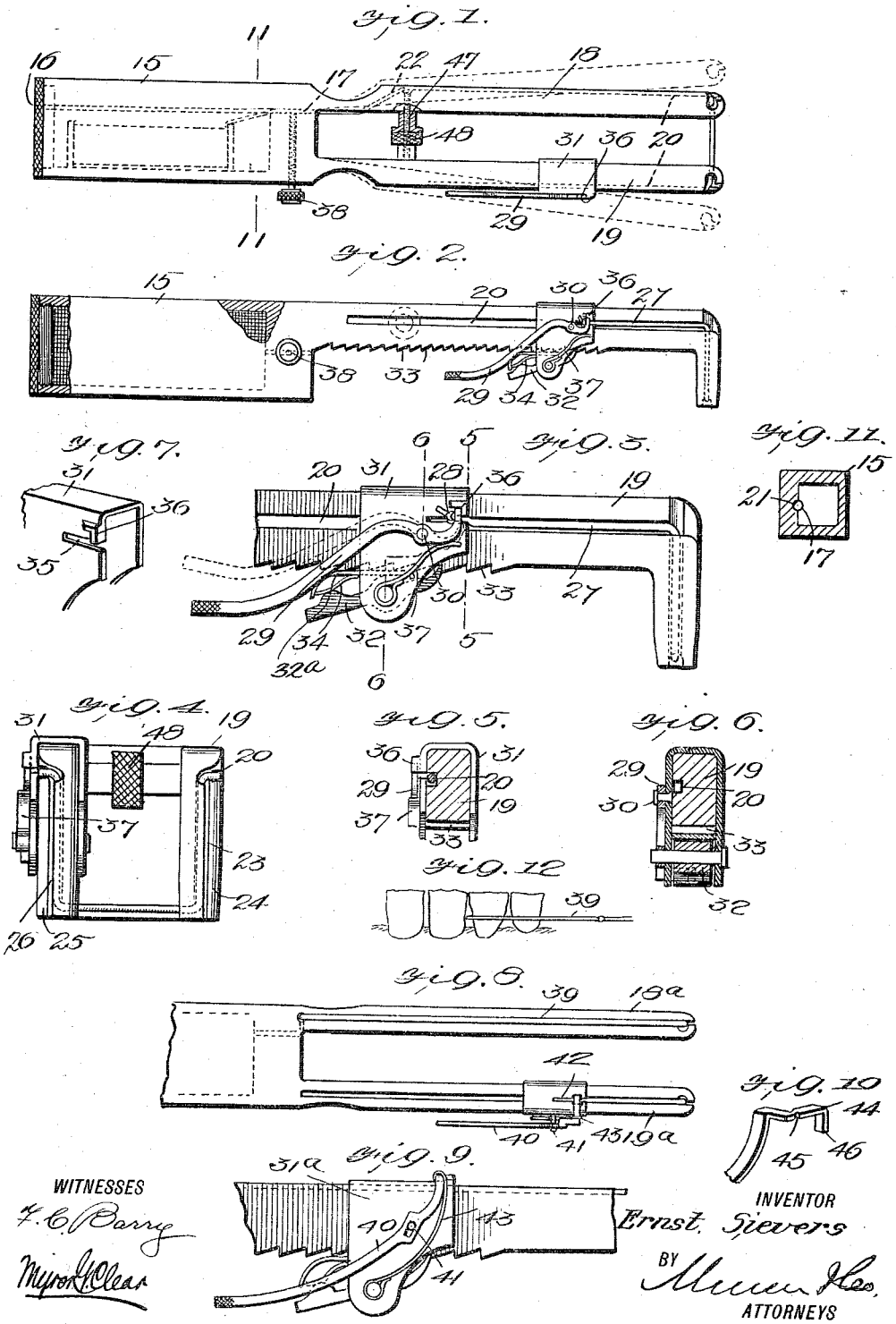

ERNST SIEVERS, OF NEW YORK, N. Y.

DENTAL-FLOSS HOLDER AND MANIPULATOR.

1,279,026.

Specification of Letters Patent.

Patented Sept. 17, 1918.

Application filed November 1, 1916. Serial No. 128,896.

*To all whom it may concern:*

Be it known that I, ERNST SIEVERS, a subject of the Emperor of Germany, and a resident of New York, in the county of New York and State of New York, have invented a certain new and useful Improvement in Dental-Floss Holders and Manipulators, of which the following is a specification.

My present invention relates generally to implements for holding and manipulating dental floss, the use of the latter of which, in connection with dental work, is well known, the object of my invention being generally to provide sanitary and efficient holder and manipulator which may be inserted in the oral cavity and by means of which the floss may be projected and adjusted between the teeth for the usual purpose.

A further object of my invention is to provide an implement including spaced apart floss holding fingers, the spacing between which may be quickly and conveniently adjusted and the threading of which may be readily and quickly accomplished.

A still further object of my invention is to provide an implement including spaced and substantially parallel floss holding fingers, together with means in connection with and movable upon one of the fingers for retaining the free end of the floss.

The principal object and purpose of the invention is, however, as above stated, to provide a simply constructed instrument especially sanitary, to apply dental floss but not limited to such use, and adapted for the public as well as for dentists, and with this in mind my invention resides in the features of construction, arrangement and operation to be hereinafter described with respect to the accompanying drawings forming a part of this specification, and wherein—

Figure 1 is a plan view of the instrument;

Fig. 2 is a side view thereof partly broken away and in section;

Fig. 3 is an enlarged side view of the outer portion thereof;

Fig. 4 is an end view looking at the outer end of the implement;

Figs. 5 and 6 are detail vertical sections through one of the floss holding fingers, taken respectively on lines 5—5 and 6—6 of Fig. 3;

Fig. 7 is a detail perspective view of one end of the adjustable slide;

Fig. 8 is a view similar to Fig. 1, of a portion of a construction involving a modified form;

Fig. 9 is an enlarged side view of a portion of the construction shown in Fig. 8;

Fig. 10 is a detail perspective view of a portion of the clamping lever shown in Fig. 9;

Fig. 11 is a cross section through the handle taken substantially on line 11—11 of Fig. 1, and Fig. 12 is a view illustrating the practical application of the invention.

Referring now to these figures, and particularly to Figs. 1 to 7 inclusive, the handle 15 of my improved implement is preferably hollow, in order to hold a cone bobbin or other form of dental floss supply, the hollow of the handle being preferably closed at one end by means of a screw or otherwise connected cap 16, the edge of which is shown in Figs. 1 and 2 as knurled, in order that it may be readily and conveniently screwed into and out of place.

The handle portion 15 of the implement thus forms a magazine for holding floss supply over which the thread floss is fed forwardly and outwardly through the opening 17 extending through the forward end of the handle portion to a point adjacent the rear end of one of the forwardly extending floss-carrying fingers 18 and 19, which, it will be noted from Fig. 1, are normally in substantially parallel spaced relation, with thread holding grooves 20 extending longitudinally along their outer faces.

The inner rear end of the opening 17 just above referred to, within the inner end of the bore of the handle 15, communicates with a groove 21 in the wall of the bore of the handle, as seen particularly in Fig. 11, in order that a needle placed within the groove 21 with the floss therethrough may, by turning the handle of the implement uppermost, be caused to descend by gravity through the opening 17, guided as it is by the groove 21 and thus projected within the operator's reach forwardly of the forward end of the handle.

The thread so extended through the opening 17 may be fed into the outer groove of the finger 18 through an angular opening 22 adjacent the inner end of said finger, and is thence fed into the vertical groove 23 of the down-turned forward end 24 of the said finger 18 and across the space between the fingers to the down-turned end 25 of the finger 19, the down-turned ends 24 and 25 being in parallel relation so as to span a row of teeth and permit the floss to be readily projected to move between the teeth, as seen by reference to Fig. 12.

The down-turned outer end 25 of the finger 19 has a vertical groove 26 similar to the groove 23 of the down-turned end 24 of the finger 18, into which the floss is fed in order that the latter may be guided into the outer groove 20 of the finger 19 and rearwardly along the latter, as seen by a comparison of Figs. 3 and 4, the free end of the floss, as indicated at 27 in Fig. 3, being preferably knotted as seen at 28, in order to provide for its effective engagement by an intermediately pivoted clamping lever 29.

The lever 29 is fulcrumed at 30 upon a slide 31 movable upon the finger 19 and provided with a pawl 32 in engagement with the lower rack 33 of the said finger, the pawl being controlled by a spring 34 so that the slide is normally permitted to move in a rearward direction only and said slide having a lower strip 32$^a$ movable therewith on the rack surface of finger 19 as a guide, and to which the spring 34 is connected.

The slide has a forward longitudinal slot 35 as seen in Fig. 7, through which the knotted end of the floss is extended to a point laterally beyond the slide and at the rear of a laterally projecting stop 36 against which the forward floss-holding end of the lever 29 normally extends under the tension of a spring 37.

Thus, when the floss has been threaded through the implement, as described, it is locked at that portion thereto extending through the before mentioned opening 17 by means of a thumb screw 38 threaded laterally through the forward portion of the handle 15, the inner end of which is preferably without threads for a short distance and binds against and secures the thread without injuring the same and is also preferably rounded so as to completely fill the opening 17 in use, and thus insure a tight grip against the thread in the said opening. When so locked with the free end 28 of the floss engaged by the lever 29, the slide 31 may be moved rearwardly to draw the floss taut between the down-turned extremities 24 and 25 of the two fingers 18 and 19, so that it may be readily and easily projected between the teeth, as at 39 in Fig. 12.

Ordinarily, the floss so disposed, is manipulated vertically between the teeth, to free the spaces therebetween, but in any instance where its vertical movement between the teeth is obstructed, it is to be observed that the lever 29 constitutes a locking means for the floss by manipulation of which the floss may be readily released, and by moving the implement away from the teeth, it may be drawn through the grooves of the finger 19 in its down-turned forward extension 25 and drawn laterally from the space between the teeth, to the desired end.

In the form shown in Figs. 8, 9 and 10, the guide grooves 39 of the fingers 18$^a$ and 19$^a$ are formed along the upper surface for receiving the floss, and the slide 31$^a$ movable and held in adjusted position, as in the form shown in Figs. 1 to 7 inclusive, is provided with a lever 40 which is longitudinally shiftable upon a pin and slot connection as at 41, in order to release the same from the floss, the free end of which is extended into a slot 42 of the slide, the upper end of a curved spring 43 engaging the upper laterally projecting extension 44 of the lever at a point 45 some distance from the down-turned floss engaging extremity 46 of the lever, as seen in Fig. 10, which projects through the upper opening of the slot in order to effectively engage and adjustably lock the free end of the floss for the same purpose as before described in connection with the lever 20.

As seen in Fig. 1, the floss holding finger 18 is preferably provided with a rigid laterally projecting stud 47 adjacent its inner end and projecting toward the finger 19 for the reception of an adjusting screw 48, manipulation of which may thus cause its movement either toward or away from the finger 19 to vary the distance between the fingers, and thus bring about an adjustable spacing of the outer effective ends thereof, the fingers 18 and 19 being sufficiently flexible in their nature to permit spreading them apart, as indicated in dotted lines in Fig. 1, by the use of the adjusting screw 48.

Thus, from the foregoing, it is obvious that I provide a simply constructed and readily operated device which, though not limited to the purposes stated, is particularly adapted thereto, which will be entirely sanitary in use, and which is susceptible of utilization by either the public at large or dental operatives in their professional capacity.

I claim:—

1. A dental floss holder including a hollow handle and a pair of spaced floss holding fingers projecting forwardly from the handle, having downturned forward ends and provided with floss guiding grooves extending along the same and along said downturned extremities thereof, the said handle having an opening through its forward portion through which floss may be fed from the hollow thereof to the grooves of the fingers, and said handle having a groove in the inner surface thereof within said hollow and in alinement with the said feed opening, said groove extending longitudinally of the handle whereby to guide a threading needle and the like through the hollow of the handle and into the said feed opening.

2. A dental floss holder including a hollow handle and a pair of spaced floss holding fingers projecting forwardly from the handle, having downturned forward ends and provided with floss guiding grooves extending along the same and along said downturned extremities thereof, the said handle having an opening through its forward portion through which floss may be fed from the hollow thereof to the grooves of the fingers, means adjustable along one of the said fingers to engage the free end of the floss in its groove, and means in the forward portion of the handle to engage and lock the floss at a point between the handle opening and the inner end of the adjacent finger.

3. A dental floss holder including a hollow handle and a pair of spaced floss holding fingers projecting forwardly from the handle, having downturned forward ends and provided with floss guiding grooves extending along the same and along said downturned extremities thereof, the said handle having an opening through its forward portion through which floss may be fed from the hollow thereof to the grooves of the fingers, a set screw threaded through the forward portion of the handle and into the said feed opening to bear against and lock the floss in the feed opening, and means adjustable along one of the said fingers to receive and hold the free end of the floss.

4. A dental floss holding implement having a hollow handle forming a magazine, a pair of floss holding fingers projecting forwardly from the handle and provided with floss holding grooves, and means mounted upon one of the said fingers and adjustable longitudinally thereon for receiving and detachably holding the free end of the floss in the said grooves, said means including a slide having a ratchet connection with the respective finger, and a lever on the slide movable to engage and release the end of the floss.

5. A dental floss holding implement including a handle, a pair of floss holding fingers projecting forwardly from the handle in spaced relation and provided with floss guiding grooves, said handle having a bore forming a floss magazine and having a feed opening communicating between the said bore and the rear end of one of the said fingers, means for locking the floss in its passage through the said feed opening, a lever engageable with the free end of the floss adjacent the other finger, and a slide adjustable longitudinally of the latter finger and forming a support for the said lever.

ERNST SIEVERS.

Copies of this patent may be obtained for five cents each, by addressing the "Commissioner of Patents, Washington, D. C."